(12) United States Patent
Kozlov et al.

(10) Patent No.: US 7,943,104 B2
(45) Date of Patent: May 17, 2011

(54) CE-ZR BASED SOLID SOLUTIONS AND METHODS FOR MAKING AND USING THE SAME

(75) Inventors: Alexandr I. Kozlov, Tulsa, OK (US); John G. Nunan, Tulsa, OK (US); Karl C. Kharas, Louisville, CO (US)

(73) Assignee: Umicore AG & Co. KG, Hanau (DE)

( * ) Notice: Subject to any disclaimer, the term of this patent is extended or adjusted under 35 U.S.C. 154(b) by 673 days.

(21) Appl. No.: 11/403,600

(22) Filed: Apr. 13, 2006

(65) Prior Publication Data

US 2007/0244002 A1    Oct. 18, 2007

(51) Int. Cl.
*B01J 12/00* (2006.01)
*B01J 21/06* (2006.01)
*B01J 23/08* (2006.01)
*B01J 23/10* (2006.01)
*B01J 23/38* (2006.01)

(52) U.S. Cl. .......... 423/213.5; 423/212; 423/213.2; 502/300; 502/349; 502/355; 502/325; 502/302; 502/304

(58) Field of Classification Search .......... 423/213.5, 423/239.1, 212, 213.2; 502/300, 302, 304, 502/325, 349, 355
See application file for complete search history.

(56) References Cited

U.S. PATENT DOCUMENTS

| | | | | |
|---|---|---|---|---|
| 4,426,319 | A * | 1/1984 | Blanchard et al. | 502/241 |
| 6,585,944 | B1 | 7/2003 | Nunan et al. | 423/239.1 |
| 6,610,629 | B2 * | 8/2003 | Hinago et al. | 502/300 |
| 2005/0054694 | A1 * | 3/2005 | Seddon et al. | 514/362 |

OTHER PUBLICATIONS

Qi et al., "$MnO_x$-$CeO_2$ mixed oxides prepared by co-precipitation for selective catalytic reduction of NO with $NH_3$ at low temperatures", accepted Jan. 27, 2004; Applied Catalysis B: Environmental 51 (2004) pp. 93-106.

Eigenmann et al., "Selective reduction of NO By $NH_3$ over manganese-cerium mixed oxides: Relation between adsorption, redox and catalytic behavior", accepted Aug. 24, 2005, Applied Catalysis B: Environmental 62 (2006) pp. 311-318.

Deraika et al., "A simplified approach to determine the activation energies of uncatalyzed and catalyzed combustion of soot", accepted Jun. 23, 2002, Applied Catalysis B: Environmental 40 (2003) pp. 219-229.

Qi et al., Characterization and FTIR Studies of $MnO_x$—$CeO_2$ Catalyst for Low-Temperature Selective Catalytic Reduction of NO with $NH_3$, In Final Form: Jul. 23, 2004; J. Phys. Chem B. (2004) 108, pp. 15738-15747.

* cited by examiner

*Primary Examiner* — Jerry Lorengo
*Assistant Examiner* — Jared Wood
(74) *Attorney, Agent, or Firm* — Smith, Gambrell & Russell, LLP

(57) ABSTRACT

In one embodiment, a solid solution material comprises, based upon 100 mole %: about 30 mol% about 95 mol % zirconium, about 0.5 mol % to about 50 mole % cerium, up to about 20 mole % of a stabilizer selected from the group consisting of yttrium, rare earths, and combinations comprising at least one of the stabilizers, and about 0.01 to about 25 mole % of a metal selected from the group consisting of indium, tin, and mixtures comprising at least one of the foregoing metals.

15 Claims, 3 Drawing Sheets

CE-ZR BASED SOLID SOLUTIONS AND METHODS FOR MAKING AND USING THE SAME

BACKGROUND OF THE INVENTION

Solid electrolytes based on zirconia ($ZrO_2$), thoria ($ThO_2$), and ceria ($CeO_2$) doped with lower valent ions have been extensively studied. The introduction of lower valent ions, such as rare earths (yttrium (Y), lanthanum (La), neodymium (Nd), dysprosium (Dy), etc.) and alkaline earths (strontium (Sr), calcium (Ca), and magnesium (Mg)), results in the formation of oxygen vacancies in order to preserve electrical neutrality. The presence of the oxygen vacancies in turn gives rise to oxygen ionic conductivity (OIC) at high temperatures (e.g., greater than 800° C.). Typical commercial or potential applications for these solid electrolytes includes their use in solid oxide fuel cells (SOFC) for energy conversion, oxygen storage (OS) materials in three-way-conversion (TWC) catalysts, electrochemical oxygen sensors, oxygen ion pumps, structural ceramics of high toughness, heating elements, electrochemical reactors, steam electrolysis cells, electrochromic materials, magnetohydrodynamic (MHD) generators, hydrogen sensors, catalysts for methanol decomposition and potential hosts for immobilizing nuclear waste.

Both $CeO_2$ and $ThO_2$ solid electrolytes exist in the cubic crystal structure in both doped and undoped forms. In the case of doped $ZrO_2$ partially stabilized $ZrO_2$ consists of tetragonal and cubic phases while the fully stabilized form exists in the cubic fluorite structure. The amount of dopant required to fully stabilize the cubic structure for $ZrO_2$ varies with dopant type. For Ca it is in the range of 12-13 mole %, for $Y_2O_3$ and $Sc_2O_3$ it is greater than 18 mole % of the Y or scandium (Sc), and for other rare earths (e.g., $Yb_2O_3$, $Dy_2O_3$, $Gd_2O_3$, $Nd_2O_3$, and $Sm_2O_3$) it is in the range of 16-24 mole % of ytterbium (Yb), Dy, gadolinium (Gd), Nd, and samarium (Sm).

Solid solutions consisting of $ZrO_2$, $CeO_2$ and trivalent dopants are used in three-way-conversion (TWC) catalysts as oxygen storage (OS) materials and are found to be more effective than pure $CeO_2$ both for higher oxygen storage capacity and in having faster response characteristics to air-to-fuel (A/F) transients. In the automotive industry there is also great interest in developing lower temperature and faster response oxygen sensors to control the A/F ratio in the automotive exhaust. Additionally, reports concerning the use of ceria-based catalysts for soot oxidation and selective catalytic reduction of NOx with ammonia reveal new uses for solid solutions of $CeO_2$ with other elements where low temperature $Ce^{4+}$<- - -> $Ce^{3+}$ redox activity probably does not have the critical importance that this redox activity has in TWC catalysis.

Oxygen storage (OS) in automotive catalyst applications arises due to the facile nature of $Ce^{4+}$<- - -> $Ce^{3+}$ redox cycle in typical exhaust gas mixtures. Benefits of yttrium and other rare earth doped $CeO_2$—$ZrO_2$ solid solutions compared to undoped $CeO_2$ and $CeO_2$—$ZrO_2$ for TWC catalyst applications is due to improved $Ce^{4+}$ reducibility at relatively low temperatures and enhanced oxygen ion conductivity (OIC), i.e., mobility of oxygen in the oxygen sublattice. These characteristics of the above mentioned solid solutions make them efficient in providing extra oxygen for the oxidation of hydrocarbons (HC) and carbon monoxide (CO) under fuel rich conditions when not enough oxygen is available in the exhaust gas for complete conversion to carbon dioxide ($CO_2$) and water ($H_2O$). Solid solutions with cubic structures were found to have advantages over other crystal structures.

The OS/OIC function is significantly enhanced by platinum group metals (PGM) such as palladium (Pd), platinum (Pt), and rhodium (Rh). In the presence of the precious metals, the reduction of the $Ce^{4+}$ to $Ce^{3+}$ in doped $CeO_2$—$ZrO_2$ solid solutions occurs at lower temperatures and improves TWC catalyst efficiency in reducing HC, CO, and nitrogen oxides (NOx) pollutants.

New emission regulations impose stringent requirements on catalyst durability, for example, 120,000 miles durability in the US and 160,000 kilometers (km) durability in Europe. One of the disadvantages of the current state of the art of yttrium and rare earth doped $CeO_2$—$ZrO_2$ solid solutions is loss of the OS/OIC properties as a function of aging due to segregation of the OS/OIC function from the PGM in typical TWC compositions. Thus improvement of the OS function of solid solutions is needed to maintain catalyst performance in the aged state. Therefore, one of our strategies was to enhance and stabilize the OS function by adding dopants that increase oxygen availability from OS/OIC at low temperatures, even in the absence of the PGM.

The new regulations also require control of soot and NOx emissions from diesel engines whose exhaust gas is essentially always net oxidizing. Mixed oxides of ceria may be useful for these conditions even though the reducibility of ceria that can occur under net reducing conditions has little relevance given the oxidizing nature of diesel exhaust gas. The origins of benefits of ceria in these emerging applications is not as well understood as in the case of established TWC catalyst applications.

What is needed in the art are OS/OIC materials having stable crystal structures, more specifically, cubic, as well as facile and high oxygen storage and oxygen ion conductivity properties.

SUMMARY

Disclosed herein are $CeO_2$—$ZrO_2$ based solid solutions and methods for making and using these solutions.

In one embodiment, a solid solution material comprises, based upon 100 mole %: about 30 mol % about 95 mol % zirconium, about 0.5 mol % to about 50 mole % cerium, up to about 20 mole % of a stabilizer selected from the group consisting of yttrium, rare earths, and combinations comprising at least one of the stabilizers, and about 0.01 to about 25 mole % of a metal selected from the group consisting of indium, tin, and mixtures comprising at least one of the foregoing metals.

In one embodiment, a catalyst comprises: a solid solution material, a noble metal, and a porous support, wherein the solid solution material, noble metal, and porous support are deposited on a substrate. The solid solution comprises: about 30 mol % about 95 mol % zirconium, about 0.5 mol % to about 50 mole % cerium, up to about 20 mole % of a stabilizer selected from the group consisting of yttrium, rare earths, and combinations comprising at least one of the stabilizers, and about 0.01 to about 25 mole % of a metal selected from the group consisting of indium, tin, and mixtures comprising at least one of the foregoing metals.

In one embodiment, a method for reducing a concentration of at least one contaminant in an exhaust stream comprises: exposing the exhaust stream to a catalyst and reducing the concentration of at least one contaminant in the exhaust stream. The catalyst comprises: a solid solution material, a noble metal, and a porous support, wherein the solid solution material, noble metal, and porous support are deposited on a substrate. The solid solution comprises: about 30 mol % about 95 mol % zirconium, about 0.5 mol % to about 50 mole % cerium, up to about 20 mole % of a stabilizer selected from the group consisting of yttrium, rare earths, and combinations comprising at least one of the stabilizers, and about 0.01 to about 25 mole % of a metal selected from the group consisting of indium, tin, and mixtures comprising at least one of the foregoing metals.

The above described and other features will be appreciated and understood from the following detailed description, drawings, and appended claims.

BRIEF DESCRIPTION OF THE DRAWINGS

Refer now to the figures, which are meant to be exemplary and not limiting.

DESCRIPTION OF THE PREFERRED EMBODIMENT

Figure 1:
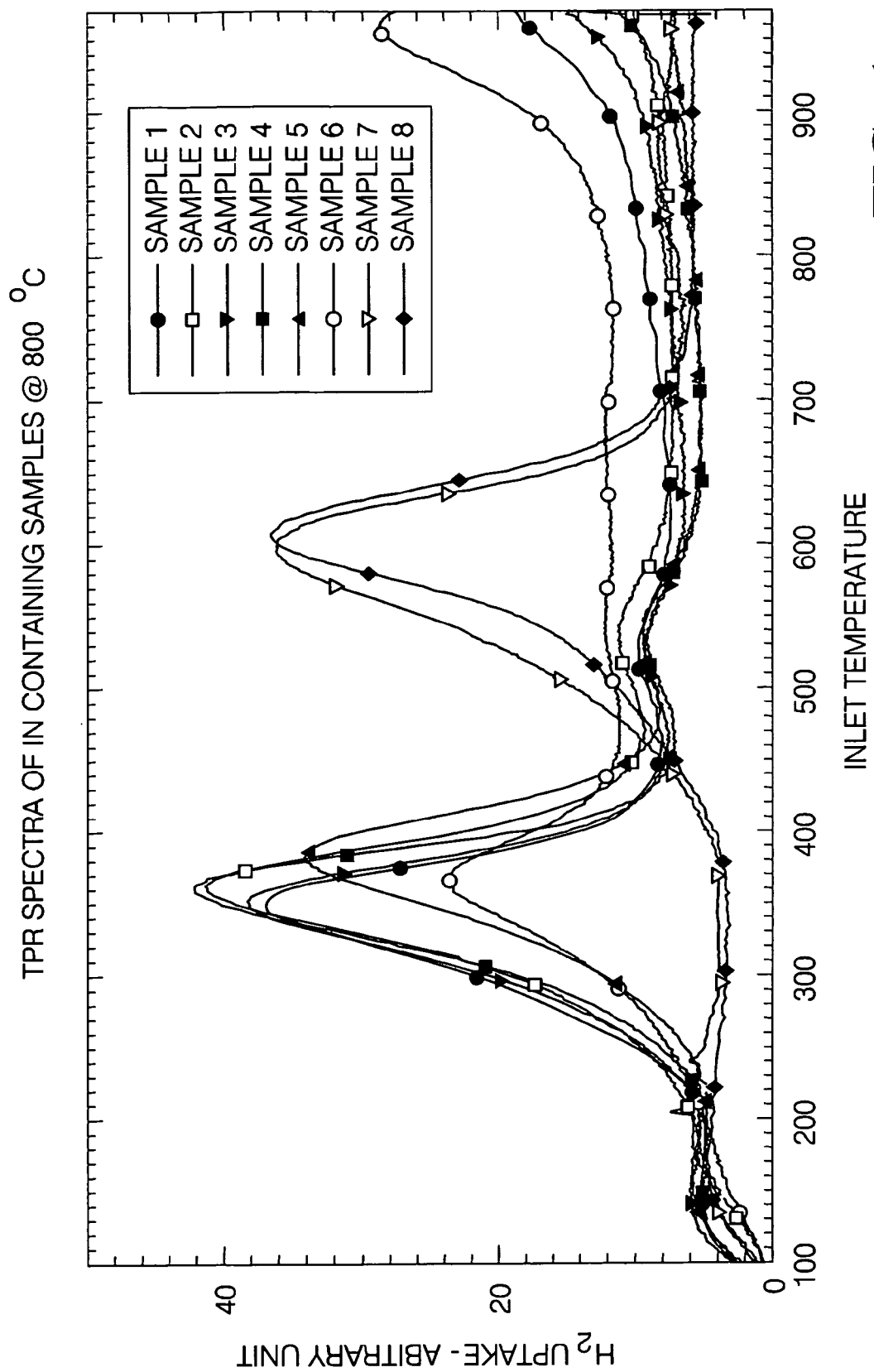
FIG. 1 is a graphical representation illustrating $Ce^{4+}$ reducibility in selected 800° C.-aged OS/OIC material compositions using temperature programmed reduction in hydrogen ($H_2$-TPR) method.

Disclosed herein are $CeO_2$—$ZrO_2$ solid solutions having a stable cubic structure in which indium (In) and/or tin (Sn) are incorporated into the cubic crystalline structure, or, more particularly into the cubic fluorite structure. The solid solution comprises: cerium (Ce), zirconium (Zr), rare earth metal stabilizer(s), and indium (In) and/or tin (Sn), in addition to the oxygen.

This solid solution can comprise a balance of a sufficient amount of zirconium to minimize the reduction energies of $Ce^{4+}$ and the activation energy for mobility of 'O' within the lattice, a sufficient amount of cerium to provide the desired oxygen storage capacity, sufficient amount of stabilizer to stabilize the solid solution in the cubic crystalline phase, and a sufficient amount of indium and/or tin to enhance facile nature of the OS function. The increased facile nature of the OS function is characterized by the lowering of the reduction temperature of $Ce^{4+}$ by greater than or equal to about 150° C. as indicated by $H_2$-TPR analysis.

The solid solution can comprises less than or equal to about 95 mole percent (mol %) zirconium, or more specifically, about 30 mol % to about 90 mol %, or, even more specifically about 50 mol % to about 85 mol %. The solid solution can also comprise less than or equal to about 50 mol % cerium, or more specifically, about 0.5 mol % to about 45 mol %, or, even more specifically about 5 mol % to about 40 mol %. The stabilizer can be present in an amount of less than or equal to about 20 mol %, or more specifically, about 0.5 mol % to about 15 mol %, or, even more specifically about 5 mol % to about 15 mol %. The In and/or Sn can, individually, be present in an amount of about 0.01 mol % to about 25 mol %, or more specifically, about 0.1 mol % to about 15 mol %, or, even more specifically about 0.5 mol % to about 10 mol %, and yet more specifically, about 1 mol % to about 5 mol %.

The stabilizer can comprise a metal such as yttrium (Y), lanthanum (La), praseodymium (Pr), neodymium (Nd), scandium (Sc), promethium (Pm), samarium (Sm), europium (Eu), gadolinium (Gd), terbium (Tb), ytterbium (Yb), and so forth, as well as combinations comprising at least one of the foregoing metals. For example, La and Y can be present in the solid solution; in another example, the stabilizer can comprise yttrium and a rare earth metal.

The solid solution has a cubic crystal structure, particularly a cubic fluorite crystal structure as characterized by powder X-ray diffraction (XRD) analysis of the cation sublattice, even for compositions that have in excess of 50 mole percent (mol %) zirconium. As is supported by Table 1 below, the percentage of this OS/OIC material having the cubic structure is greater than or equal to about 95%, with greater than or equal to about 99% typical, and essentially 100% cubic structure generally obtained (i.e., an immeasurable amount of tetragonal phase based on XRD analysis) even under both oxidizing and reducing conditions up to 1,000° C. Not to be limited by theory, it is believed that reduction in hydrogen environment results in formation of dispersed indium metal atoms in the bulk solid or on the solid solution surface. Under oxidizing conditions these indium metal atoms are believed to be incorporated back into the cubic fluorite structure.

The catalyst comprising the solid solution can be employed in an exhaust treatment device, e.g., disposed on/in a substrate. Exhaust treatment devices can generally comprise housing components that can be easily attached to exhaust conduit and comprise a substrate for treating exhaust gases. The housing components can comprise an outer "shell", which can be capped on either end with funnel-shaped "end-cones" or flat "end-plates", which can comprise "snorkels" that allow for easy assembly to exhaust conduit. Housing components can be fabricated of any materials capable of withstanding the temperatures, corrosion, and wear encountered during the operation of the exhaust treatment device, such as, but not limited to, ferrous metals or ferritic stainless steels (e.g., martensitic, ferritic, and austenitic stainless materials, and the like).

Disposed within the shell can be a retention material ("mat" or "matting"), which is capable of supporting a substrate, insulating the shell from the high operating temperatures of the substrate, providing substrate retention by applying compressive radial forces about it, and provide the substrate impact protection. The matting is typically concentrically disposed around the substrate forming a substrate/mat sub-assembly.

Various materials can be employed for the matting and the insulation. These materials can exist in the form of a mat, fibers, preforms, or the like, and comprise materials such as, but not limited to, intumescent materials (e.g., a material that comprises vermiculite component, i.e., a component that expands upon the application of heat), non-intumescent materials, ceramic materials (e.g., ceramic fibers), organic binders, inorganic binders, and the like, as well as combinations comprising at least one of the foregoing materials. Non-intumescent materials include materials such as those sold under the trademarks "NEXTEL" and "INTERAM 1101HT" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescent materials which are also sold under the aforementioned "FIBERFRAX" trademark.

Substrates can comprise any material designed for use in a spark ignition or diesel engine environment and having the following characteristics: (1) capable of operating at temperatures up to about 600° C, and up to about 1,000° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials can be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate can have any size or geometry, the size and geometry are preferably chosen to optimize surface area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

The exhaust treatment devices can be assembled utilizing various methods. Three such methods are the stuffing, clamshell, and tourniquet assembly methods. The stuffing method generally comprises pre-assembling the matting around the substrate and pushing, or stuffing, the assembly into the shell through a stuffing cone. The stuffing cone serves as an assembly tool that is capable of attaching to one end of the shell. Where attached, the shell and stuffing cone have the same cross-sectional geometry, and along the stuffing cone's length, the cross-sectional geometry gradually tapers to a larger cross-sectional geometry. Through this larger end, the substrate/mat sub-assembly can be advanced which compresses the matting around the substrate as the assembly advances through the stuffing cones taper and is eventually pushed into the shell.

This exhaust treatment device can then be employed in an exhaust system, a fuel cell system, and so forth, to reduce a concentration of contaminant(s) in the exhaust stream. As noted above, this device comprises the catalyst on a substrate disposed within a housing. The catalyst, comprising the solid solution, noble metal(s), and a porous support, can contact the gas stream and reduce the concentration of at least one component therein.

The following examples, which are merely exemplary and not limiting, further illustrate the solid solution.

WORKING EXAMPLES

Example 1

Preparation of $Zr_{0.627}Ce_{0.250}La_{0.042}Y_{0.061}In_{0.020}O_{1.939}$ Solid Solution 143.4 grams (g) of 36.97 weight percent (wt %) ZrO$(NO_3)_2$ solution, 39.87 g of Ce$(NO_3)_3$.6H$_2$O, 6.65 g of La$(NO_3)_3$.6H$_2$O, 8.39 g of Y$(NO_3)_3$.6H$_2$O, and 2.81 g of In$(NO_3)_3$.4H$_2$O were dissolved in 500 milliliters (ml) of deionized water. The resulting homogeneous solution was added slowly under vigorous stirring to 1.35 liters (L) of 4 molar (M) ammonium hydroxide (NH$_4$OH) to precipitate mixed metal hydrous oxides. The reaction mixture was additionally stirred for 3 hours. The precipitate was filtered, washed with deionized water, and then dried at 110° C. for 12 hours. Dried powder was ground, and calcined at 800° C. for 6 hours. The resultant solid solution had a cubic structure with lattice constant of 5.227(4) Angstroms (Å) by x-ray diffraction (XRD) analysis. The surface area was 46.6 square meters per gram (m$^2$/g) for the as-prepared sample, and 13.4 m$^2$/g after aging for 6 hours at 1,000° C. in static air.

Example 2

Preparation of $Zr_{0.620}Ce_{0.248}La_{0.017}Y_{0.096}In_{0.019}O_{1.934}$ Solid Solution The preparation was the same as for Example 1, but used 143.4 g of 36.97 wt % ZrO$(NO_3)_2$ solution, 39.87 g of Ce$(NO_3)_3$.6H$_2$O, 2.66 g of La$(NO_3)_3$.6H$_2$O, 13.42 g of Y$(NO_3)_3$.6H$_2$O, and 2.81 g of In$(NO_3)_3$.4H$_2$O. The resultant solid solution had a cubic structure with lattice constant of 5.215(3) Å by XRD analysis. The surface area was 36.4 m$^2$/g for the as-prepared sample, and 7.6 m$^2$/g after aging for 6 hours at 1,000° C. in static air.

Example 3

Preparation of $Zr_{0.565}Ce_{0.300}La_{0.017}Y_{0.098}In_{0.020}O_{1.933}$ Solid Solution The preparation was the same as for Example 1, but used 128.17 g of 36.97 wt% ZrO$(NO_3)_2$ solution, 47.47 g of Ce$(NO_3)_3$.6H$_2$O, 2.66 g of La$(NO_3)_3$.6H$_2$O, 13.42 g of Y$(NO_3)_3$.6H$_2$O, and 2.81 g of In$(NO_3)_3$.4H$_2$O. The resultant solid solution had a cubic structure with lattice constant of 5.238(2) Å by XRD analysis. The surface area was 49.5 m$^2$/g for the as-prepared sample, and 5.9 m$^2$/g after aging for 6 hours at 1,000° C. in static air.

Example 4

Preparation of $Zr_{0.503}Ce_{0.360}La_{0.017}Y_{0.100}In_{0.020}O_{0.931}$ Solid Solution The preparation was the same as for Example 1, but used 111.68 g of 36.97 wt % ZrO$(NO_3)_2$ solution, 55.7 g of Ce$(NO_3)_3$.6H$_2$O, 2.66 g of La$(NO_3)_3$.6H$_2$O, 13.42 g of Y$(NO_3)_3$.6H$_2$O, and 2.81 g of In$(NO_3)_3$.4H$_2$O. The resultant solid solution had a cubic structure with lattice constant of 5.261(3) Å by XRD analysis. The surface area was 34.1 m$^2$/g for the as-prepared sample, and 4.1 m$^2$/g after aging for 6 hours at 1,000° C. in static air.

Example 5

Preparation of $Zr_{0.630}Ce_{0.247}La_{0.017}Y_{0.096}In_{0.010}O_{1.931}$ Solid Solution The preparation was the same as for Example 1, but used 145.94 g of 36.97 wt % ZrO$(NO_3)_2$ solution, 39.87 g of Ce(NO$_3$)$_3$.6H$_2$O, 2.66 g of La(NO$_3$)$_3$.6H$_2$O, 13.42 g of Y(NO$_3$)$_3$.6H$_2$O, and 1.41 g of In(NO$_3$)$_3$.4H$_2$O. The resultant solid solution had a cubic structure with lattice constant of 5.201(2) Å by XRD analysis. The surface area was 46.4 m$^2$/g for the as-prepared sample, and 5.1 m$^2$/g after aging for 6 hours at 1,000° C. in static air.

Example 6

Preparation of Zr$_{0.478}$Ce$_{0.376}$La$_{0.086}$Pr$_{0.039}$In$_{0.021}$O$_{1.940}$ solid Solution The preparation was the same as for Example 1, but used 101.52 g of 36.97 wt % ZrO(NO$_3$)$_2$ solution, 55.7 g of Ce(NO$_3$)$_3$.6H$_2$O, 12.63 g of La(NO$_3$)$_3$.6H$_2$O, 5.76 g of Pr(NO$_3$)$_3$.6H$_2$O, and 2.81 g of In(NO$_3$)$_3$.4H$_2$O. The resultant solid solution had a cubic structure with lattice constant of 5.317(2) Å by XRD analysis. The surface area was 61.2 m$^2$/g for the as-prepared sample, and 0.5 m$^2$/g after aging for 6 hours at 1,000° C. in static air.

Example 7

Preparation of Zr$_{0.648}$Ce$_{0.250}$La$_{0.042}$Y$_{0.060}$O$_{1.949}$ Solid Solution The preparation was the same as for Example 1, but 148.5 g of 36.97 wt % ZrO(NO$_3$)$_2$ solution, 39.87 g of Ce(NO$_3$)$_3$.6H$_2$O, 6.65 g of La(NO$_3$.6H$_2$O and 8.39 g of Y(NO$_3$)$_3$.6H$_2$O. The resultant solid solution had a cubic structure with lattice constant of 5.219(3) Å by XRD analysis. The surface area was 50.8 m$^2$/g for the as-prepared sample, and 13.7 m$^2$/g after aging for 6 hours at 1,000° C. in static air.

Example 8

Preparation of a Zr$_{0.640}$Ce$_{0.247}$La$_{0.017}$Y$_{0.096}$O$_{1.944}$ Solid Solution The preparation was the same as for Example 1, but 143.4 g of 36.97 wt % ZrO(NO$_3$)$_2$ solution, 39.87 g of Ce(NO$_3$)$_3$.6H$_2$O, 2.66 g of La(NO$_3$)$_3$.6H$_2$O and 13.42 g of Y(NO$_3$)$_3$.6H$_2$O. The resultant solid solution had a cubic structure with lattice constant of 5.214(4) Å by XRD analysis. The surface area was 43.2 m$^2$/g for the as-prepared sample, and 11.8 m$^2$/g after aging for 6 hours at 1,000° C. in static air.

Table 1 provides XRD analysis of synthesized powder after calcinations at 800° C. for 6 hours in static air.

TABLE 1

| No. | Solid Solution Composition (wt %) | | | | | | $P_{ID}^4$ | Lattice Constant (Å) | Crystallite size CS$^1$ (Å) | $R_p^2$ (%) |
| | CeO$_2$ | ZrO$_2$ | La$_2$O$_3$ | Y$_2$O$_3$ | Pr$_6$O$_{11}$ | In$_2$O$_3$ | | | | |
|---|---|---|---|---|---|---|---|---|---|---|
| 1 | 31.5 | 56.5 | 5.0 | 5.0 | 0.0 | 2.0 | SC$^3$ | 5.227(4) | 70(2) | 11.91 |
| 2 | 31.5 | 56.5 | 2.0 | 8.0 | 0.0 | 2.0 | SC | 5.215(3) | 77(2) | 11.09 |
| 3 | 37.5 | 50.5 | 2.0 | 8.0 | 0.0 | 2.0 | SC | 5.238(2) | 71(2) | 10.87 |
| 4 | 44.0 | 44.0 | 2.0 | 8.0 | 0.0 | 2.0 | SC | 5.261(3) | 68(2) | 11.46 |
| 5 | 31.5 | 57.5 | 2.0 | 8.0 | 0.0 | 1.0 | SC | 5.201(2) | 76(2) | 12.00 |
| 6 | 44.0 | 40.0 | 9.5 | 0.0 | 4.5 | 2.0 | SC | 5.317(2) | 62(2) | 14.04 |
| 7 | 31.5 | 58.5 | 5.0 | 5.0 | 0.0 | 0.0 | SC | 5.219(3) | 72(2) | 11.56 |
| 8 | 31.5 | 58.5 | 2.0 | 8.0 | 0.0 | 0.0 | SC | 5.214(4) | 76(2) | 12.17 |

$^1$CS is crystallite size
$^2$R$_p$ is profile fitting
$^3$SC is cubic single phase
$^4$P$_{ID}$ is Phase identification Indium atoms were successfully incorporated into the cubic structure of CeO$_2$—ZrO$_2$ solid solutions over a wide range of Ce to Zr ratios. No phase segregation was observed in the presence of yttrium and rare earth dopants. Crystallite sizes of indium containing solid solutions were similar to that of solid solutions that do not contain indium. All the materials possessed single cubic phase by XRD analysis, and the lattice constant increased with increased Ce content in the solid solutions.

Figure 2:
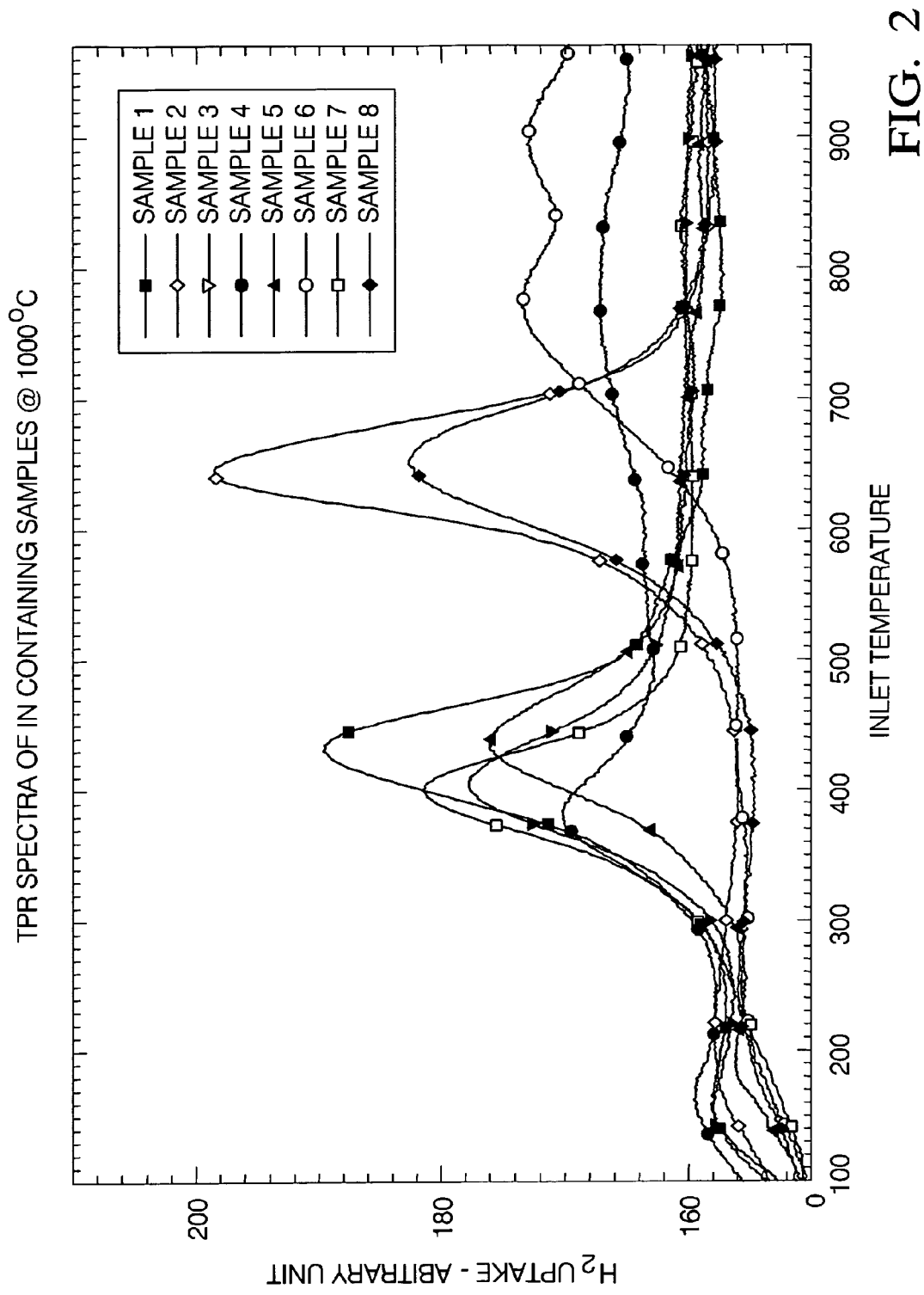
FIG. 2 is a graphical representation $Ce^{4+}$ reducibility in selected 1,000° C.-aged OS/OIC material compositions using $H_2$-TPR method.

The present solid solution possesses large improvement in durable redox activity with respect to facile oxygen storage function (Table 2 and FIGS. 1 and 2). As one can see in as-synthesized indium containing solid solutions, the Ce$^{4+}$ is reducible at a temperature below 400° C. (FIG. 1). The reduction temperatures are typically 200° C. to 250° C. lower compared to those in CeO$_2$—ZrO$_2$ solid solutions that do not contain indium, Samples 7 and 8. In the case of mixed oxides aged at 1,000° C. for 6 hours in air, the Ce$^{4+}$ reduction in Zr-rich Samples 1-3 and 5 is shifted to lower temperatures by about 200° C. to about 250° C. compared to corresponding mixed oxides without indium, Samples 7 and 8 (FIG. 2).

TABLE 2

| | | TPR peak position(s), ° C. | |
|---|---|---|---|
| Sample No. | Solid Solution Composition | After 800° C., 6 hour calcination in air | After 1,000° C., 6 hour calcination in air |
| 1 | Zr$_{0.627}$Ce$_{0.250}$La$_{0.042}$Y$_{0.061}$In$_{0.020}$O$_{1.939}$ | 360 | 432 |
| 2 | Zr$_{0.620}$Ce$_{0.248}$La$_{0.017}$Y$_{0.096}$In$_{0.019}$O$_{1.934}$ | 362 | 400 |
| 3 | Zr$_{0.565}$Ce$_{0.300}$La$_{0.017}$Y$_{0.098}$In$_{0.020}$O$_{1.933}$ | 351 | 406 |

TABLE 2-continued

| | | TPR peak position(s), °C. | |
|---|---|---|---|
| Sample No. | Solid Solution Composition | After 800° C., 6 hour calcination in air | After 1,000° C., 6 hour calcination in air |
| 4 | $Zr_{0.503}Ce_{0.360}La_{0.017}Y_{0.100}In_{0.010}O_{1.931}$ | 350 | 379, 775 |
| 5 | $Zr_{0.630}Ce_{0.247}La_{0.017}Y_{0.096}In_{0.020}O_{1.931}$ | 384 | 436 |
| 6 | $Zr_{0.478}Ce_{0.376}La_{0.086}Pr_{0.039}In_{0.021}O_{1.940}$ | 367 | 775 |
| 7 | $Zr_{0.648}Ce_{0.250}La_{0.042}Y_{0.060}O_{1.949}$ | 598 | 642 |
| 8 | $Zr_{0.640}Ce_{0.247}La_{0.017}Y_{0.096}O_{1.944}$ | 606 | 651 |

As can be seen from Table 2, solid solutions with indium give $Ce^{4+}$ reduction at temperatures of less than or equal to about 500° C., or, more specifically, less than or equal to about 450° C., or, even more specifically, less than or equal to about 400° C., e.g., at about 350° C. to about 390° C., after calcination for 6 hours at 800° C. in air. Additionally, even after calcination for 6 hours at 1,000° C. in air, the $Ce^{4+}$ in the zirconia-rich solid solutions was reducible at temperatures of less than or equal to about 600° C., or, more specifically, less than or equal to about 550° C., or, even more specifically, less than or equal to about 500° C., and yet more specifically, less than or equal to about 450° C.; e.g., at about 400° C. to about 440° C.

Increasing $CeO_2$ content to 44.0 wt % (Samples 4 and 6) resulted in expansion of solid solution lattice due to substitution of small Zr cation with larger Ce cation (Table 1). Lattice expansion has an effect on $Ce^{4+}$ reducibility as shown in Table 2. The solid solution of composition $Zr_{0.478}Ce_{0.376}La_{0.086}Pr_{0.039}In_{0.021}O_{1.940}$ has lattice constant of 5.317 Å and showed no low temperature peak less than 500° C. after aging. Low temperature $Ce^{4+}$ reducibility for aged solid solutions with high Ce content was achieved by selecting suitable dopants. Using La and Y in Sample 4 resulted in a solid solution $Zr_{0.503}Ce_{0.360}La_{0.017}Y_{0.100}In_{0.020}O_{1.931}$ with a lattice constant of 5.26 Å and the same $CeO_2$ content of 44.0 wt % as in Sample 6. As is supported by Table 2 and FIG. 2 significant portion of $Ce^{4+}$ was reducible at temperatures below 500° C. in the Sample 4.

Example 9

Preparation of $Ce_{0.45}Zr_{0.4}La_{0.05}Y_{0.05}Sn_{0.05}O_2$

Mixtures of nitrates of Ce(III), La, Y, zirconyl nitrate, and stannic chloride were dissolved in deionized water and sorbitol (2 moles sorbitol per mole of metal). The solution was steam evaporated to dryness. Initial calcination was performed in air at 700° C. and a portion of each material was subsequently calcined at 1,000° C. X-ray diffraction analysis was performed for the samples. Phase analysis revealed pure-phase fluorites in both calcined solutions.

Example 10

Preparation of $Ce_{0.4}Zr_{0.4}La_{0.05}Y_{0.05}Sn_{0.10}O_2$

Mixtures of nitrates of Ce(III), La, Y, zirconyl nitrate, and stannic chloride were dissolved in deionized water and sorbitol (2 moles sorbitol per mole of metal). The solution was steam evaporated to dryness. Initial calcination was performed in air at 700° C. and a portion of each material was subsequently calcined at 1,000° C. X-ray diffraction analysis was performed for the samples. Phase analysis revealed fluorites in both calcined solutions. The sample calcined at 700° C. was a pure-phase fluorite, while the sample calcined at 1,000° C. had $SnO_2$ (cassierite) present.

Example 11

Preparation of $Ce_{0.35}Zr_{0.4}La_{0.05}Y_{0.05}Sn_{0.15}O_2$

Mixtures of nitrates of Ce(III), La, Y, zirconyl nitrate, and stannic chloride were dissolved in deionized water and sorbitol (2 moles sorbitol per mole of metal). The solution was steam evaporated to dryness. Initial calcination was performed in air at 700° C. and a portion of each material was subsequently calcined at 1,000° C. X-ray diffraction analysis was performed for the samples. Both samples had fluorite and $SnO_2$ (cassierite) phases present.

Figure 3:
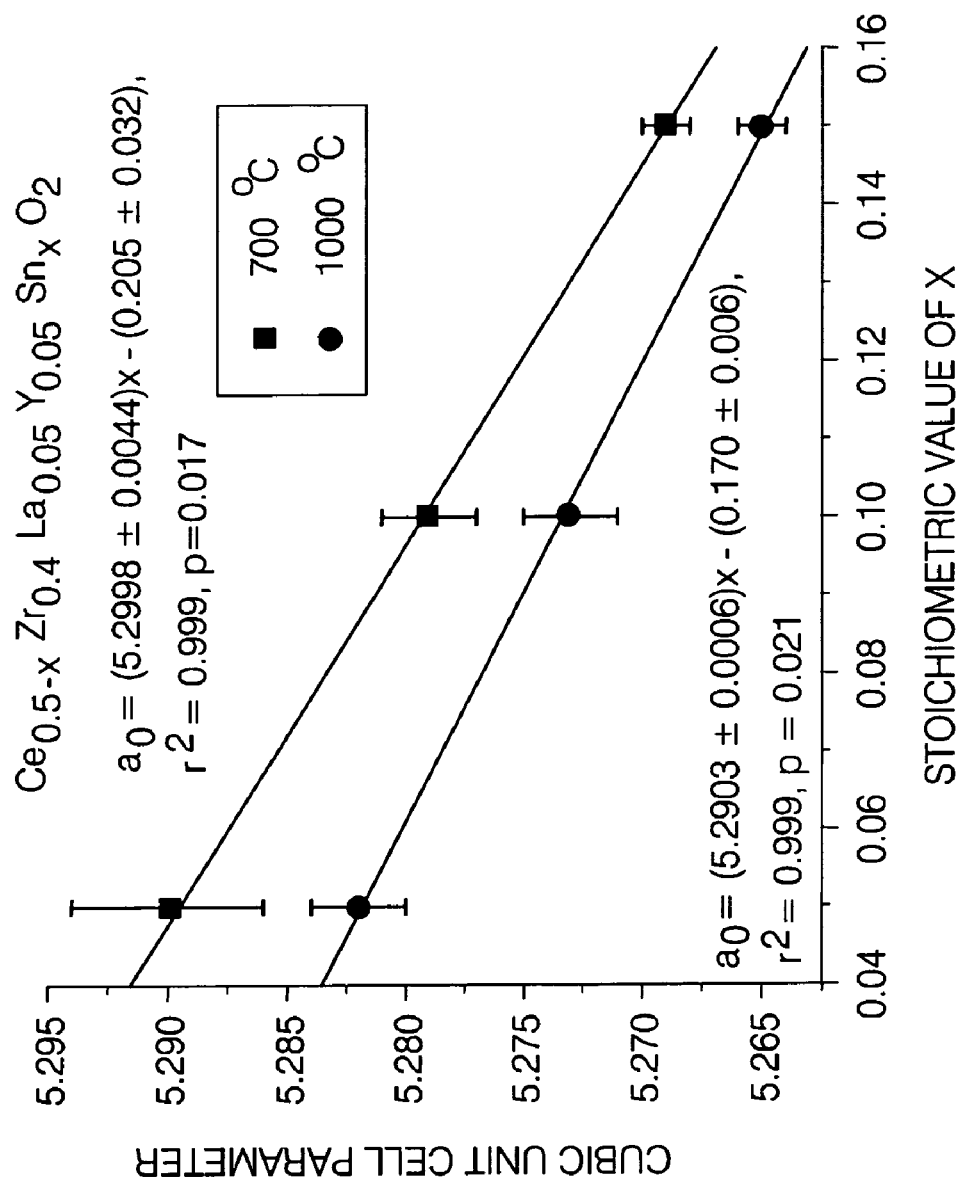
FIG. 3 is a graphical representation of cubic unit cell parameter per stoichiometric value of x for a solid solution comprising tin.

The results of Examples 9-11 are plotted in FIG. 3. The results demonstrate that tin can be incorporated into ceria-zirconia solid solution. These results show that the fluorite structure is phase stable at tin concentrations of about 0.01 mol % to about 8 mol %, or, more specifically, about 0.5 mol % to about 5 mol %. It is believed that other synthetic approaches can allow the production of ceria-zirconia fluorites containing greater than 5 mole percent tin that are phase stable.

Due to the enhanced phase stability and oxygen ion conducting properties of these OS/OIC materials, they can be employed in numerous applications, including: in solid oxide fuel cells (SOFC) for energy conversion, in electrochemical oxygen sensors, in oxygen ion pumps, structural ceramics of high toughness, in heating elements, in electrochemical reactors, in steam electrolysis cells, in electrochromic materials, in magnetohydrodynamic (MHD) generators, in hydrogen sensors, in catalysts for methanol decomposition, as potential hosts for immobilizing nuclear waste, as OS materials in TWC catalysts, as well as in other applications where oxygen storage capacity and/or oxygen ion conductivity are factors.

When used as oxygen storage materials in TWC catalysts, for example, the OS/OIC material would be supported on a substrate as part of the three-way-conversion catalyst (e.g., noble metals, such as platinum, palladium, iridium, osmium, rhodium, ruthenium, as well as combinations comprising at least one of these noble metals, and a high surface area porous support such as a high surface area alumina, as well as other metals and metal oxides, and combinations comprising at least one of the foregoing). It is believed that, when exposed to an exhaust environment, this combined material would exhibit substantially equal or increased three-way-conversion capabilities compared to a conventional catalyst having a higher catalyst (e.g., metal) loading, and substantially equal capabilities compared to a conventional catalyst having a higher cerium content.

For example, when used in an exhaust system for converting hydrocarbons, carbon monoxide, and nitrogen oxides in an exhaust stream, the catalyst comprising the OS/OIC material, and a support (preferably a high surface area porous support as has been used with OS/OIC materials), and noble metal deposited on a substrate, is exposed to the exhaust stream. Hydrocarbons, carbon monoxide and nitrogen oxides in the exhaust stream are then converted to nitrogen, carbon dioxide, and water.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc). As used herein, "combination" is inclusive of blends, mixtures, alloys, oxides, copolymers, reaction products, and the like, as applicable. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants).

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method for reducing a concentration of at least one contaminant in an exhaust stream, comprising:
    exposing the exhaust stream to a catalyst having a stable cubic fluorite structure, wherein the catalyst comprises
        a solid solution oxygen storage material comprising
            about 30 mol% about 95 mol% zirconium;
            about 0.5 mol% to about 50 mol% cerium;
            up to about 20 mol% of a stabilizer selected from the group consisting of yttrium, rare earths, and combinations comprising at least one of the stabilizers;
            an amount of yttrium which amount may be provided in the stabilizer; and
            about 0.01 to about 25 mol% of indium, said indium being incorporated into said cubic fluorite structure, and wherein the amount of indium enhances the facile nature of the oxygen storage material by lowering of the reduction temperature of $Ce^{4+}$;
        a noble metal; and
        a high surface area porous support;
            wherein the solid solution oxygen storage material, noble metal, and the porous support are deposited on a substrate designed for use in a spark ignition or diesel engine environment; and
    reducing the concentration of at least one contaminant in the exhaust stream.

2. A catalyst having a stable cubic fluorite structure, comprising:
    a solid solution oxygen storage material comprising
        about 30 mol% about 95 mol% zirconium;
        about 0.5 mol% to about 50 mol% cerium;
        up to about 20 mol% of a stabilizer selected from the group consisting of yttrium, rare earths, and combinations comprising at least one of the stabilizers;
        an amount of yttrium which amount may be provided in the stabilizer; and
        about 0.01 to about 25 mol% of indium, said indium being incorporated into said cubic fluorite structure, and wherein the amount of indium enhances the facile nature of the oxygen storage material by lowering of the reduction temperature of $Ce^{4+}$;
    a noble metal; and
    a high surface area porous support;
        wherein the solid solution oxygen storage material, noble metal, and the porous support are deposited on a substrate designed for use in a spark ignition or diesel engine environment.

3. The catalyst of claim 2, wherein the indium is present in an amount of about 0.1 mol% to about 15 mol%.

4. The catalyst of claim 3, wherein the indium is present in an amount of about 0.5 mol% to about 10 mol%.

5. The catalyst of claim 2, comprising about 50 mol% to about 85 mol% zirconium, about 0.5 mol% to about 45 mol% cerium, and about 0.5 mol% to about 15 mol% stabilizer.

6. The catalyst of claim 5, comprising about 5 mol% to about 40 mol% cerium and about 5 mol% to about 15 mol% stabilizer.

7. The catalyst of claim 5, wherein the stabilizer is selected from the group consisting of yttrium, lanthanum, praseodymium, neodymium, scandium, promethium, samarium, europium, gadolinium, terbium, ytterbium, and combinations comprising at least one of the foregoing metals.

8. The catalyst of claim 2, wherein the cerium is reducible at a temperature of less than or equal to about 500° C.

9. The catalyst of claim 8, wherein the temperature is less than or equal to about 450° C.

10. The catalyst of claim 9, wherein the temperature is less than or equal to about 400° C.

11. The catalyst of claim 10, wherein the temperature is about 350° C. to about 390° C., after calcination for 6 hours at 800° C. in air.

12. The catalyst of claim 2, wherein the cerium is reducible at a temperature of less than or equal to about 600° C., after calcination for 6 hours at 1,000° C. in air.

13. The catalyst of claim 12, wherein the temperature is less than or equal to about 550° C.

14. The catalyst of claim 12, wherein the temperature is less than or equal to about 450° C.

15. The catalyst of claim 2, wherein greater than or equal to about 95% of the catalyst maintains a cubic fluorite crystal structure under oxidizing conditions and/or under reducing conditions, at temperatures of up to 1,000° C.

* * * * *